United States Patent [19]

Fresmann et al.

[11] 4,019,598
[45] Apr. 26, 1977

[54] ARTICULATED TRACTOR

[75] Inventors: Karl Heinz Fresmann; Saul Herscovici, both of Waterloo, Iowa

[73] Assignee: Deere & Company, Moline, Ill.

[22] Filed: Jan. 27, 1975

[21] Appl. No.: 544,064

[52] U.S. Cl. .................................. 180/51; 74/740; 180/53 D; 180/134
[51] Int. Cl.² ........................................ B60K 17/34
[58] Field of Search .......... 180/51, 52, 53 D, 70 R, 180/134; 74/740

[56] References Cited
UNITED STATES PATENTS

| | | | |
|---|---|---|---|
| 3,191,709 | 6/1965 | Symons | 180/51 |
| 3,701,393 | 10/1972 | Lemons | 180/53 R X |
| 3,763,949 | 10/1973 | Freiburger | 180/51 |
| 3,773,129 | 11/1973 | Anderson | 180/51 X |
| 3,774,474 | 11/1973 | Recker et al. | 74/740 |

*Primary Examiner*—Joseph F. Peters, Jr.
*Assistant Examiner*—John P. Silverstrim

[57] ABSTRACT

An articulated four-wheel drive tractor has front and rear frame structures joined by vertical pivots and supported by front and rear drive axle assemblies. The tractor has a split, speed change transmission with a first section supported on the front frame structure and a second section supported on the rear frame structure. The first transmission section is driven by an engine mounted above the front axle structure and its output is transferred to the second transmission section through an upper driveshaft which crosses the axis of articulation and drives a gear train on the rear frame structure forwardly of the second transmission section. The second transmission section output shaft is connected directly to the rear axle assembly and is connected to the front axle assembly through a second driveshaft which crosses the axis of articulation below the upper driveshaft. A live PTO is connected to the engine output shaft in front of the first transmission section and includes a PTO driveshaft which crosses the axis of articulation between the first and second driveshafts. Each of the three driveshafts crossing the axis of articulation includes a pair of universal joints equally spaced to the front and rear of the pivot axis.

7 Claims, 6 Drawing Figures

ARTICULATED TRACTOR

BACKGROUND OF THE INVENTION

Most agricultural and industrial tractors are two-wheel drive tractors, with rear drive wheels and steerable front wheels. However, there is a trend towards larger, higher horsepower tractors, and with their requirement for greater traction there is a trend toward four wheel drive tractors which are articulated about a vertical axis so that steering is accomplished by swinging one frame section relative to the other frame section. Such four wheel drive articulated tractors are still relatively low-volume production machines as compared to the more conventional two wheel drive tractors and it is therefore desirable that as many components of the four wheel drive tractors as posssible be common to the two wheel drive tractor so as to keep the price of tooling and production equipment at a minimum.

SUMMARY OF THE INVENTION

According to the present invention there is provided an articulated four wheel drive vehicle with a novel arrangement of components and which has a maximum number of components which are common with components used in a two wheel drive tractor.

Another feature of the invention resides in a novel arrangement of components in a drive train of an articulated four wheel drive vehicle which includes a transmission section on both the front and rear frame structure of the vehicle and which includes a live power take-off.

The above features and additional features, objects and advantages of the invention will become apparent to those skilled in the art from a reading of the following detailed description when taken in conjunction with the accompanying drawings.

DESCRIPTION OF THE PREFERRED EMBODIMENT

Figure 1:
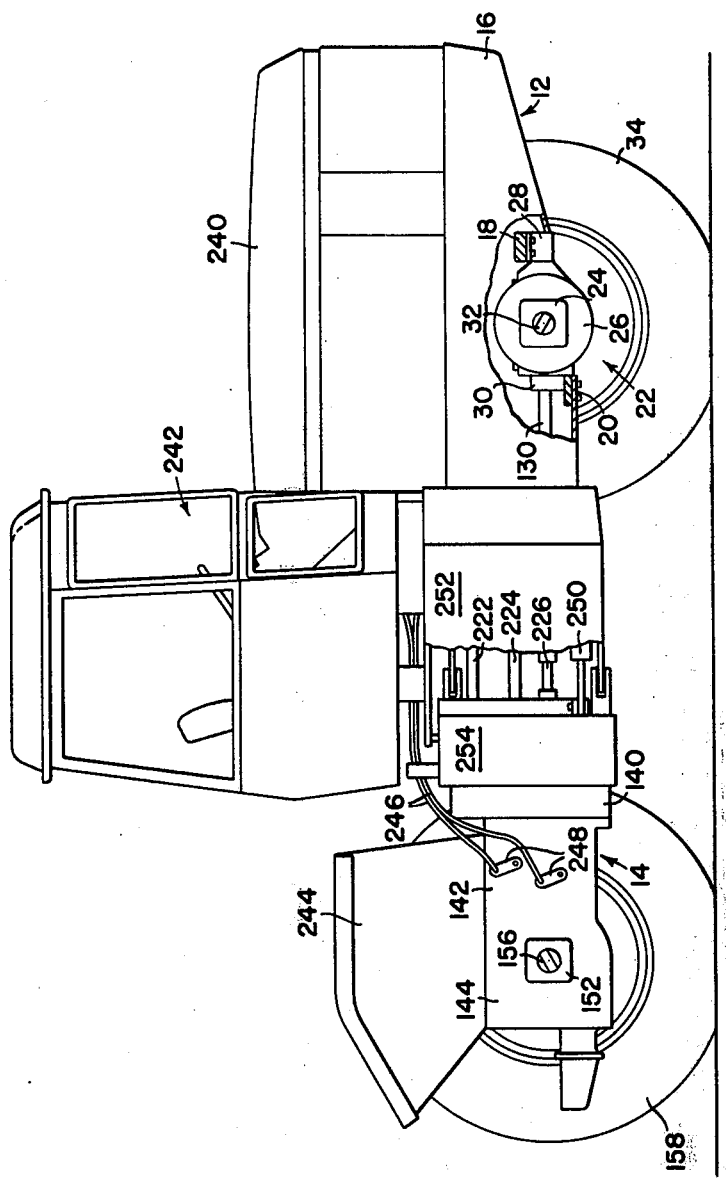
FIG. 1 is a side elevational view of a tractor embodying the invention, portions of the tractor being broken away to more clearly illustrate the invention.
Figure 2A:
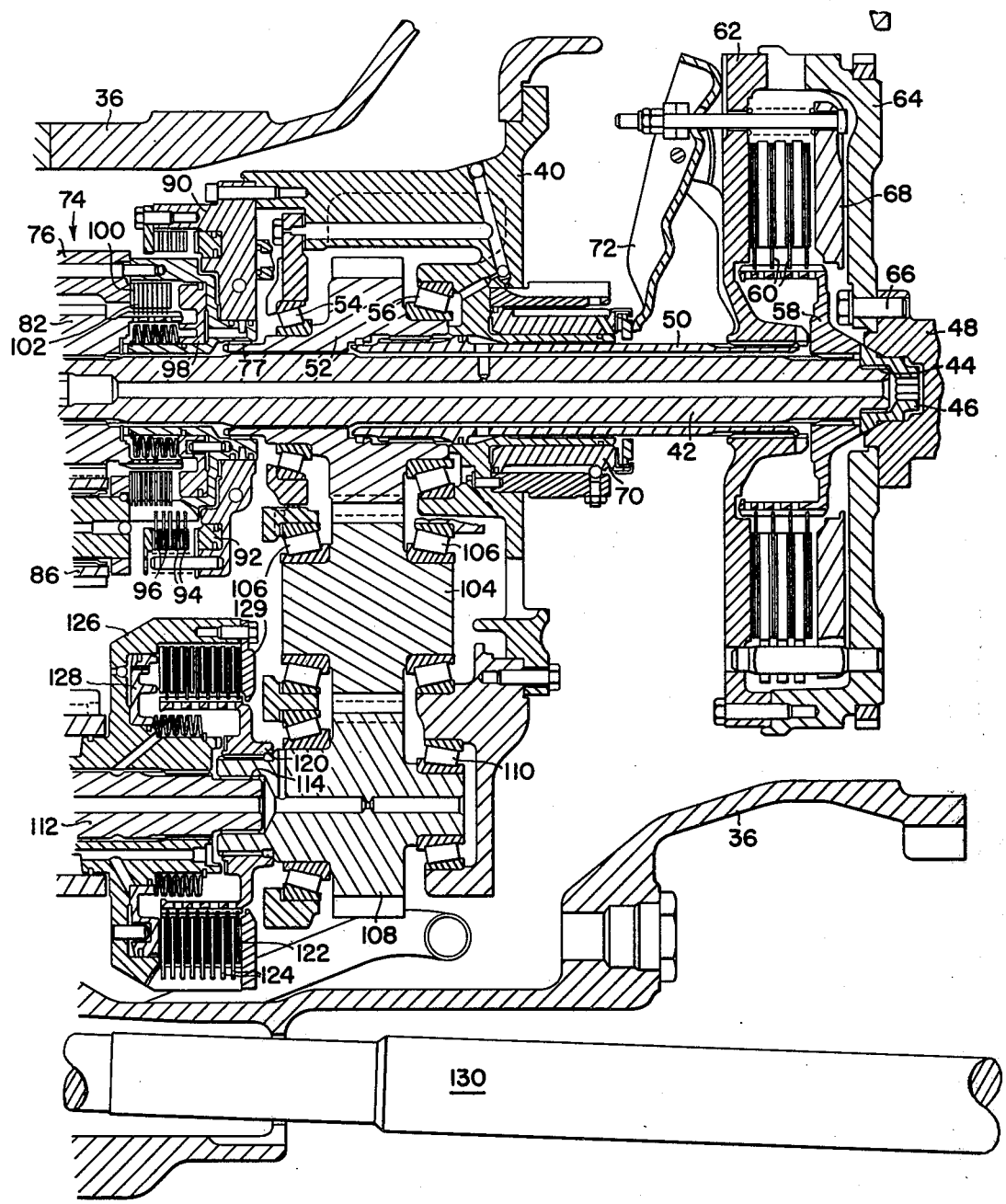
FIG. 2a through 2d are, when placed side by side in alphabetical order, with FIG. 2a to the right, a fore-and-aft vertical section through the center of a tractor drive train.
Figure 2B:
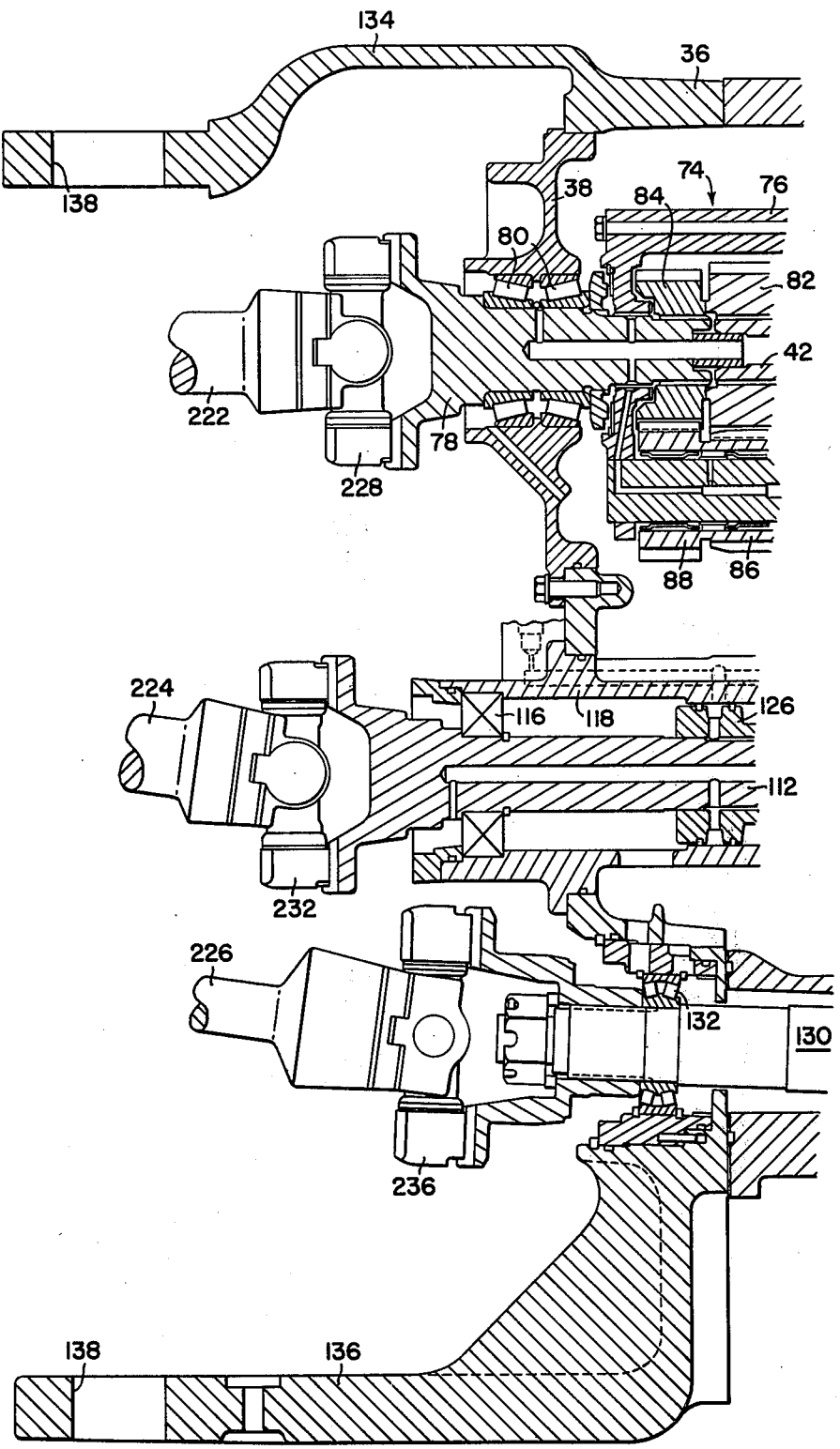
Figure 2C:
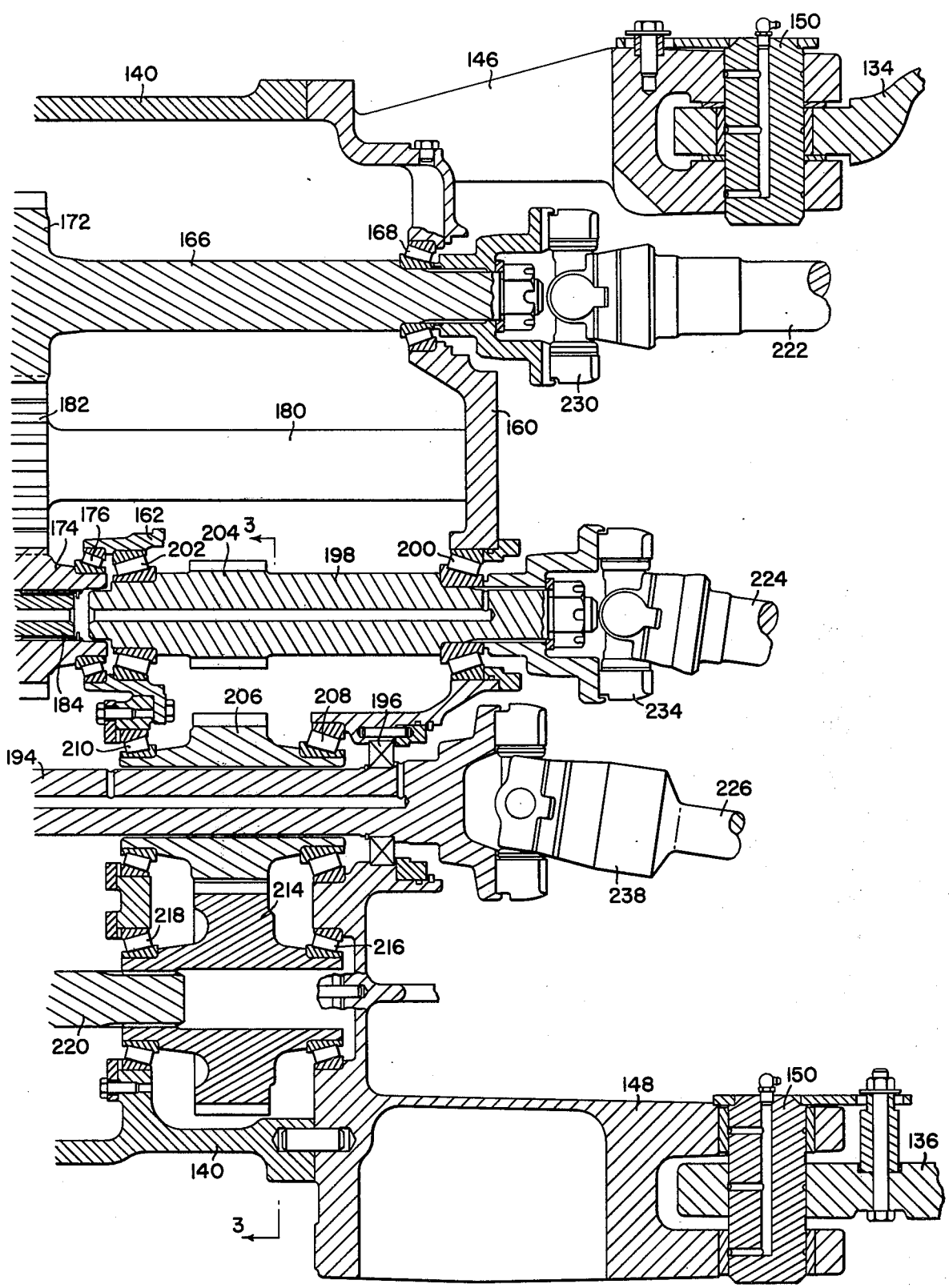
Figure 2D:
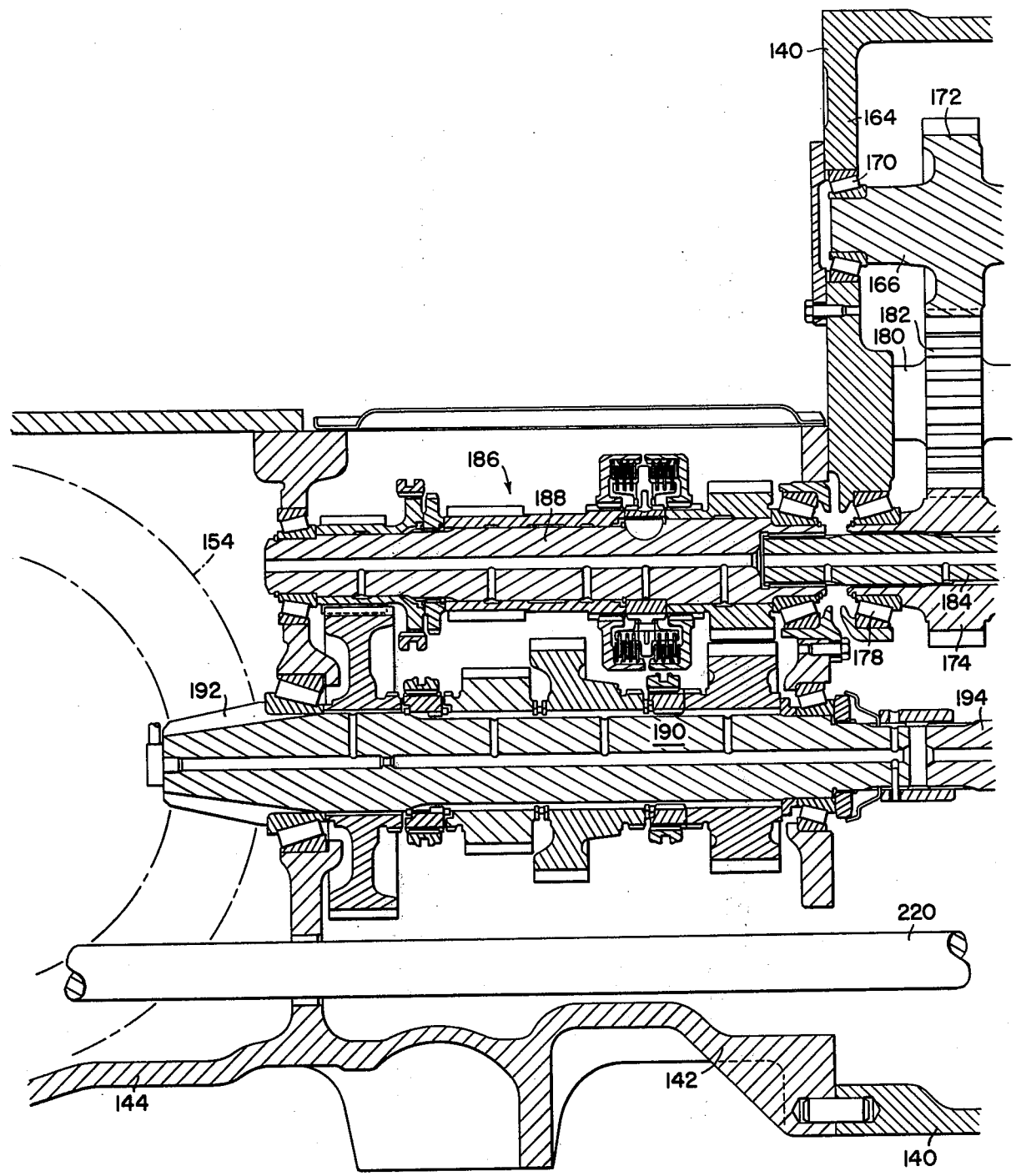
Figure 3:
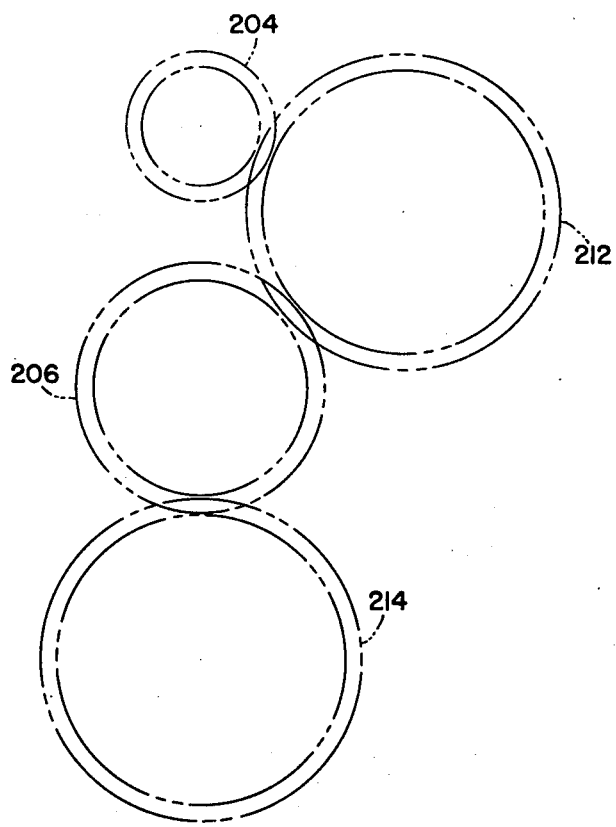
FIG. 3 is a schematic illustration of a sectional view taken substantially along the lines 3—3 of FIG. 2c.

The invention is embodied in a four wheel drive articulated tractor having an articulated main frame formed by pivotally interconnected front and rear frame structures 12 and 14 respectively. The front frame structure includes a pair of fore-and-aft elongated beams 16 forming opposite sides of the frame structure and a pair of transverse beams 18 and 20 which rigidly interconnect the beams 16. A front axle assembly indicated generally at 22 supports the front frame structure and includes a pair of axial housings 24 extending transversely from opposite sides of a central differential housing 26 which is pivotally mounted on transverse beams 18 and 20 by pivot brackets 28 and 30, respectively. The front axle assembly 22 is free to oscillate with respect to the front frame structure about a fore-and-aft axis extending through the pivot brackets 28 and 30. As is conventional, differential gearing is contained within the differential housing 26 and drives a pair of front drive axles 32 which drive front wheels 34.

The front frame structure also includes or supports a transmission housing 36 which includes a rear vertical wall 38 and a forward vertical wall 40. The forward end of the housing 36 is adapted to be connected to the block of an engine which is supported by the front frame structure above the front axle assembly. The support wall 40 and the engine to which the transmission is to be attached define a clutch housing, and a traction input shaft 42 extends axially within the clutch housing. The right end of the input shaft 42 is supported by bearings 44 located within a bushing 46 which is affixed within an opening extending axially into the end of the engine crankshaft shown partially at 48. The traction input shaft 42 extends through a hollow power take-off (herein abbreviated as PTO) input drive shaft. The PTO input driveshaft extends through an opening provided in the wall 40 and is splined to a gear 52 which is supported from the wall 40 by bearings 54 and 56.

Located in the clutch housing is a clutch assembly which includes a traction clutch member 58 having a hub splined to the traction input shaft and carrying annular, axially shiftable friction elements 60. A clutch backing plate 62 is splined to the right end of the PTO input shaft 50 and is fixed to the rim of a flywheel 64 which in turn is fixed to the engine crankshaft 48 by bolts 66 so that the PTO input shaft 50 is always driven at engine speed. A pressure plate 68 is mounted between the flywheel 64 and friction elements 60 and, as is conventional, is mounted for rotation with the flywheel 64 as well as for axial movement toward and away from the friction elements 60 to frictionally engage the latter with the backing plate 62.

Actuating means for the traction clutch includes an annular hydraulic piston 70 which is mounted in the wall 40 in concentric relationship to the input shafts 42 and 50 and which engages the inner end of a set of radially extending clutch operating fingers 72 (only one of which is shown). When fluid pressure is applied to the left end of the piston 70 it shifts to the right against the inner ends of the clutch operating fingers 72 to engage the traction clutch and establish a driving relationship between the engine crankshaft 48 and the traction input shaft 42.

The vertical walls 38 and 40 define therebetween a first speed change transmission section which houses, directly behind the PTO drive gear 52, a two-speed or two transfer ratio planetary transmission indicated generally at 74. The planetary tranmission includes a carrier 76 having its right end journaled on and supported by the hub of the PTO drive gear 52 by bearings 77. The left end of the carrier 76 is supported on the first transmission section output shaft 78 which in turn is supported in the wall 38 by bearings 80. The traction input shaft 42 extends beyond the PTO input shaft 50, through the PTO drive gear 52, and into the carrier 76 where it has a sun gear 82 splined to its extreme left end. A sun gear 84 is splined to the extreme right end of the output shaft 78. A planet cluster gear is rotatably mounted on the carrier 76 and includes integral gears 86 and 88 respectively meshed with the sun gears 82 and 84. A support member 90 is carried by the wall 40 and generally borders the right end of the carrier 76.

An annular brake actuating piston 92 is axially shiftably mounted in the support member 90 for movement toward the planet carrier 76 is frictionally engage friction elements 94 carried by a support member 90 with friction elements 96 carried by the carrier 76. Thus, actuation of the piston 92 causes the carrier 76 to be braked against rotation resulting in a condition where the power flows from the input shaft 42 through the input sun gear 82, through the planet cluster, to the sun gear 84 and out the output shaft 78. It should be noted that the planetary gearing is chosen such that the above-described condition of the planetary transmission section results in an overdrive situation wherein the output shaft 78 is driven at a higher speed than the input shaft 42.

An annular clutch actuating piston 98 is axially shiftably mounted in the carrier 76 for axial movement to frictionally engage friction elements 100 carried by the carrier 76 with friction elements 102 carried by the input sun gear 82. Thus, actuation of the piston 98 causes the carrier to be locked to the input sun gear 82 so that the planetary transmission section is locked and the output shaft 78 is driven at the same speed as the input shaft 42.

The PTO drive shaft 52 meshes with a gear 104 supported by the wall 40 through bearings 106, and the gear 104 is in turn in mesh with a gear 108 which is supported by the wall 40 through bearings 110. The gear 108 is provided with a recessed area along its axis of rotation and the right end of a PTO shaft 112 is rotatably supported therein by bearings 114. The left end of the PTO shaft 112 is supported by bearing 116 within a sleeve 118 rigid with the wall 38. A clutch hub 120 is splined to the gear 108 and carries friction elements 122 which extend between friction elements 124 carried by a clutch element 126 splined to the PTO shaft 112. An annular piston 128 is axially shiftably mounted in the clutch element 126 for movement toward a backing plate 129 carried by the element 126 to frictionally engage the friction elements 122 and 124.

A power shaft 130 is also mounted on the front frame structure and has its left end rotatably supported on the wall 38 by bearing 132 and its right end extending into the differential housing for driving engagement with the conventional differential gears.

The front frame structure further includes rearwardly extending upper and lower pivot arms 134 and 136, respectively, which are provided with apertures 138 at their rearward ends.

The rear frame structure of the vehicle consists essentially of the housing 140 of the gear box, the housng 142 of a second or rear speed change transmission section, and a differential housing 144. A pair of upper and lower pivot arms 146 and 148 extend forwardly from the gearbox housing to forked outer ends which receive the pivot arms 134 and 136 and are provided with apertures for receiving pivot pins 150 which articulately connect the front and rear frame structures.

The rear frame structure is supported by a rear axle assembly which includes the differential housing 144 and oppositely extending axle housings 152. As is conventional, differential gearing 154 is contained within the differential housing and is in driving engagement with axles 156 which drive the rear drive wheels 158.

The gear box housing 140 includes a front wall 160, an intermediate wall 162 and a rear wall 164. The gearbox housing 140 contains an upper input shaft 166 which is rotatably supported on the walls 160 and 164 by bearings 168 and 170, respectively, and includes an integral drive gear 172. Directly below the input shaft 166, the hubs of a gear 174 are rotatably supported in the walls 162 and 164 by bearings 176 and 178. A jack shaft 180 is also rotatably supported by the walls 160 and 164 and includes an integral gear 182 in mesh with the gears 172 and 174 to transmit rotation of the input shaft 166 to the gear 174. A gearbox output shaft 184 is keyed to and carried by the gear 174 and extends through the wall 164 to the second speed change transmission section.

The second speed change transmission section indicated in its entirety of the numeral 186 is of conventional construction and is currently used on many of the tractors produced by the applicant's assignee and therefore will not be described in detail. However, for a full description of the same, reference can be had to U.S. Pat. No. 2,772,652 which issued on Dec. 4, 1956 to W. H. DuShane et al. Suffice it to say that the transmission 186 includes fore-and-aft extending input and output shafts 188 and 190, respectively. The input shaft 188 is coupled to the gearbox output 184, and the rear end of the output shaft 190 is provided with a bevel gear 192 which drives the differential gear 154. The forward end of the output shaft 190 extends into the gear box where it is connected to a transfer shaft 194 which has its forward end supported by the gearbox front wall 160 through bearing 196. The transfer shaft 194 is in vertical alignment with the gearbox input and output shafts 166 and 184.

The gear box also houses PTO input shaft 198 which is journaled in the gearbox walls 160 and 162 by bearings 200 and 202 and which includes an integral gear 204. The PTO input shaft 204 is mounted directly beneath the gearbox input shaft 166 and in axial alignment with the gearbox output shaft 184. An axially bored gear 206 surrounds the gearbox transfer shaft 194 and is supported on the gearbox walls 160 and 162 by bearings 208 and 210. A jackshaft (not shown) is also journaled between the walls 160 and 162 and includes a gear 212 which meshes with the gears 204 and 206. An additional axially bored gear 214 is supported by bearings 216 and 218 in the walls 160 and 162 directly beneath and in mesh with the gear 206. A PTO output shaft 220 has its forward or right end extending into and splined to the gear 214. The PTO output shaft extends rearwardly through the gearbox housing 140, the rear change speed transmission section housing 142 and the differential housing 144 to the rear of the tractor.

An upper driveshaft 222, an intermediate PTO driveshaft 224 and a lower driveshaft 226 extend between the front and rear frame sections to transfer power therebetween. The upper driveshaft 222 is coupled between the first speed change transmission section output shaft 78 and the gearbox input shaft 166, and includes front and rear universal joints 228 and 230 respectively which are spaced equal distances from the axis of articulation between the front and rear frame structures. The lower drive shaft 226 is coupled between the gearbox transfer shaft 194 and the power shaft 130, and includes front and rear universal joints 236 and 238, respectively. The universal joints 236 and 238 are, like the universal joints 228 and 230, spaced equal distances from the axis of articulation between the front and rear frame structures. The intermedate PTO driveshaft 224 is coupled between the PTO shaft 112 and the gearbox input PTO shaft 198, and includes front and rear universal joints 232 and 234 which, like the universal joints on the upper and lower driveshafts, are spaced equal distances from the axis of articulation between the front and rear frame structures.

To complete the overall tractor, a front hood structure 240 is positioned over the engine, the operator's station 242 is mounted on the front frame structure directly behind the front hood structure, and a pair of fenders 244 for the rear drive wheels are mounted on the rear frame structure. Suitable controls in the form of Bowden cables 246 extend from the operator's station to control levers 248 for the rear speed change transmission section.

The tractor is steered by extending or retracting hydraulic cylinders 250 connected between the front and rear frame structures on opposite sides of the axis of articulation, as is well known. A pair of fuel tanks 252 are mounted on opposite sides of the front frame structure outwardly of the pivots 150 and a hydraulic reservoir 254 is mounted on a rear frame structure.

By utilizing the arrangement of components described above, it is possible to use many components which are common with the more conventional two wheel tractor. For example, by moving the first speed change transmission section to a housing separate from the housing for the second change transmission section, the second speed change transmission section, the housing for the second speed change transmission section, the rear differential and rear axles can all be identical to those used in the more conventional two wheel drive tractors manufactured by applicant's assignee. Also, the front differential and drive axles can be identical to the rear differential and drive axles. All of these components represent major costs in a tractor, and by making them common with the components from the more conventional two wheel drive tractor the cost can be reduced. By having three driveshafts cross the axis of articulation between the front and rear frame structure it is possible to use a live PTO (a PTO driven as a function of the engine speed rather than a function of transmission speed) even though a section of the speed change transmission is supported by the front frame structure.

Having thus described a preferred embodiment of the invention, various modifications within the spirit and scope of the invention will become apparent to those skilled in the art and can be made without departing from the underlying principles of the invention. Therefore, the invention should not be limited to the specific description and illustration, but only by the following claims.

We claim:

1. An articulated tractor comprising: front and rear frame structures pivotally connected for articulation about a generally upright axis; front and rear axle assemblies connected to the front and rear frame structures, respectively, and each including a differential driving a pair of oppositely extending drive axles with a pair of drive wheels connected to and driven by the drive axles on opposite sides of the respective frame structure; an engine mounted on the front frame structure and having a rearwardly extending output shaft; a first speed change transmission section mounted on the front frame structure having an input shaft operatively coupled to the engine output shaft and a rearwardly extending output shaft; a second speed change transmission section mounted on the rear frame structure and having a fore-and-aft extending input shaft and a fore-and-aft extending output shaft with its aft end drivingly connected to the rear differential; a gearbox mounted on the rear frame structure having an upper, forwardly extending, input shaft, an intermediate output shaft parallel to the input shaft drivingly connected to the second transmission section input shaft and coupled to the gearbox input shaft by first gear means, and a lower fore-and-aft extending transfer shaft having its aft end coupled to the fore-end of the second transmission section output shaft; a first driveshaft means coupled between the first transmission section output shaft and the gearbox input shaft and having front and rear universal joints respectively disposed forwardly and rearwardly of the axis of articulation between the front and rear frame structures; a second driveshaft means having one end coupled to the fore-end of the transfer shaft, a second end drivingly coupled to the forward differential, and front and rear universal joints respectively disposed forwardly and rearwardly of the axis of articulation between the front and rear frame structure; a PTO shaft journaled on the front frame structure and having a forward end drivingly coupled to the engine output shaft by second gear means; an intermediate PTO shaft journaled in the gearbox between the gearbox input and transfer shafts; PTO driveshaft means disposed between the first and second driveshaft means and coupled between a forward end of the intermediate PTO shaft and a rearward end of the PTO shaft journaled on the front frame structure and having front and rear universal joints respectively disposed forwardly and rearwardly of the axis of articulation between the front and rear frame structures; and a PTO output shaft journaled in the rear frame structure below the second transmission section output shaft and coupled to the intermediate PTO shaft by third gear means.

2. An articulated tractor as set forth in claim 1 wherein the front and rear universal joints on each of the first, second and PTO driveshaft means are spaced equidistant from the axis of articulation between the front and rear frame structures.

3. An articulated tractor as set forth in claim 1 wherein the third gear means includes a gear coaxial with the gearbox transfer shaft.

4. An articulated tractor as set forth in claim 1 wherein the gearbox output shaft and the intermediate PTO shaft extend coaxially, and the third gear means includes a first gear fixed to the intermediate PTO shaft for rotation therewith, a second, counter, gear in mesh with the first gear, a third, counter, gear coaxial with the gearbox transfer shaft and in mesh with the second gear, and a fourth gear fixed to the PTO output shaft and in mesh with the third gear.

5. An articulated tractor comprising: front and rear frame structures pivotally connected for articulation about a generally upright axis; front and rear axle assemblies connected to the front and rear frame structure, respectively, and each including a differential driving a pair of oppositely extending axles with a pair of drive wheels connected to and driven by the axles on opposite sides of the respective frame structure; an engine mounted on the front frame structure above the front axle assembly and having a rearwardly extending output shaft; a first speed change transmission section mounted on the front frame structure having an input shaft coupled to the engine output shaft through traction clutch means and a rearwardly extending output shaft; a fore-and-aft extending PTO shaft journaled on the front frame structure below the first transmission section output shaft and having its forward end coupled to the engine output shaft through first gear means and a PTO clutch; a fore-and-aft extending power shaft journaled on the front frame structure below the PTO shaft and having its forward end drivingly connected to the front differential; a second speed change transmission section mounted on the rear frame structure haing fore-and-aft extending input and output shafts with aft end of the output shaft drivingly connected to the rear differential; a gearbox mounted on the rear frame section and having an upper, forwardly extending, input shaft, and output shaft drivingly connected to the second transmission section input shaft and coupled to the gearbox input shaft by second gear means, a transfer shaft below the input shaft connected to the forward end of the second transmission section output shaft, and an intermediate PTO shaft between the input and transfer shafts; a fore-and-aft extending PTO output shaft journaled on the rear frame structure below the second transmission section output shaft and having its forward end coupled to the intermediate PTO shaft by third gear means; and first, second, and PTO driveshaft means drivingly connected between the first transmission section output shaft and the gearbox input shaft, the gearbox transfer shaft and the power shaft, and the PTO shaft and the intermediate PTO shaft, respectively, and each including front and rear universal joints respectively disposed forwardly and rearwardly of the axis of articulation between the front and rear frame structures.

6. An articulated tractor as set forth in claim 5 wherein the first transmission section output shaft, the PTO shaft and the power shaft are in substantially vertical alignment, and the gearbox input shaft, transfer shaft and intermediate PTO shaft are in substantially vertical alignment.

7. An articulated tractor as set forth in claim 6 wherein the first and third gear means each include a gear wheel journaled for rotation about the first transmission section input shaft and the transfer shaft, respectively.

* * * * *